United States Patent
Tanaka (10) Patent No.: US 8,055,381 B2
(45) Date of Patent: Nov. 8, 2011

(54) STORAGE MEDIA LIBRARY DEVICE (75) Inventor: Kiyotaka Tanaka, Kato (JP)

(73) Assignee: Fujitsu Limited, Kawasaki (JP)

( * ) Notice: Subject to any disclaimer, the term of this patent is extended or adjusted under 35 U.S.C. 154(b) by 550 days.

(21) Appl. No.: 12/318,430

(22) Filed: Dec. 29, 2008

(65) Prior Publication Data
US 2009/0234500 A1    Sep. 17, 2009

(30) Foreign Application Priority Data

Mar. 14, 2008  (JP) ................................. 2008-066732

(51) Int. Cl.
*G06F 19/00* (2006.01)
*G11B 15/18* (2006.01)

(52) U.S. Cl. .......................................... 700/245; 360/69

(58) Field of Classification Search .......... 700/245–262, 700/280; 360/81–101; 242/337; 369/30–31; 720/600, 615, 632–634, 654
See application file for complete search history.

(56) References Cited

U.S. PATENT DOCUMENTS

| 4,631,464 A * | 12/1986 | Kato ............................ 700/258 |
| 2006/0215302 A1* | 9/2006 | Murakami ...................... 360/69 |

FOREIGN PATENT DOCUMENTS

| JP | 56-93865 | 7/1981 |
| JP | 3-91157 | 4/1991 |

* cited by examiner

*Primary Examiner* — Mary Cheung
(74) *Attorney, Agent, or Firm* — Staas & Halsey LLP (57) ABSTRACT

A storage media library device includes a media drive unit which writes and reads information on storage media, a media storage unit which stores the storage media, a robot which transports the storage media between the media drive unit and the media storage unit, a robot control unit which controls the storage media transport operation of the robot, and a vibration detection unit which detects occurrence of vibrations. The robot control unit is controlled by a library control unit, wherein if occurrence of vibrations is detected by the vibration detection unit during the robot transports the storage media, the robot control unit causes the robot to stop the storage media transport operation, and when subsidence of the vibrations is detected within a predefined time period preset in a storage media transport command and monitored by the library control unit, the robot control unit causes the robot to resume.

17 Claims, 8 Drawing Sheets

| OPERATING STATE AT THE TIME OF OCCURRENCE OF EARTHQUAKE | BEHAVIOR RESPONDING TO EARTHQUAKE |
|---|---|
| ROBOT IS ON STANDBY AND STATIONARY | ROBOT IS MOVED TO SAFE PLACE (WHERE IT DOES NOT HIT OTHER COMPONENT ELEMENTS IN DEVICE CABINET BECAUSE OF VIBRATIONS) AT SPEED SLOWER THAN USUAL TRANSPORTING SPEED SO THAT THE ROBOT DOES NOT HIT MEDIA STORAGE UNIT OR MEDIA DRIVE UNIT |
| ROBOT IS IN THE PROCESS OF MOVING TO REMOVE STORAGE MEDIUM | ROBOT IS TEMPORARILY STOPPED AT CURRENT POSITION. THEN, AFTER CONFIRMING THAT ROBOT IS NOT CLAMPING STORAGE MEDIUM, ROBOT IS MOVED TO SAFE PLACE AT SPEED SLOWER THAN USUAL TRANSPORTING SPEED. |
| ROBOT IS IN THE PROCESS OF CLAMPING STORAGE MEDIUM BY REMOVING IT FROM MEDIA STORAGE CELL | ROBOT STOPS CLAMPING STORAGE MEDIUM AND PUSHES IT BACK INTO MEDIA STORAGE CELL. THEN, ROBOT IS MOVED TO SAFE PLACE. |
| ROBOT IS IN THE PROCESS OF TRANSPORTING STORAGE MEDIUM | ROBOT TEMPORARILY STOPS AT CURRENT POSITION. THEN, ROBOT IS MOVED TO SAFE PLACE AT SPEED SLOWER THAN USUAL TRANSPORTING SPEED, WHILE HOLDING STORAGE MEDIUM. |
| ROBOT IS IN THE PROCESS OF STORING (LOADING) STORAGE MEDIUM INTO MEDIA STORAGE CELL OR MEDIA DRIVE UNIT | IF ROBOT IS STILL HOLDING STORAGE MEDIUM, STORAGE MEDIUM IS DRAWN BACK INTO ROBOT. IF ROBOT HAS ALREADY RELEASED STORAGE MEDIUM AND IS IN THE PROCESS OF PUSHING IT INTO MEDIA STORAGE CELL OR MEDIA DRIVE UNIT, ROBOT IS ALLOWED TO FINISH THE PUSHING ACTION. THEN, ROBOT IS MOVED TO SAFE PLACE AT SPEED SLOWER THAN USUAL TRANSPORTING SPEED. |

STORAGE MEDIA LIBRARY DEVICE

This application is based upon and claims the benefit of priority of the prior Japanese Patent Application No. 2008-066732, filed on Mar. 14, 2008, the entire contents of which are incorporated herein by reference.

FIELD

The present invention relates to a storage media library device that writes and reads information (data) to and from a plurality of storage media in a media drive unit (also called a media drive), storing the plurality of storage media.

BACKGROUND

Conventionally, a storage media library device contains a media drive unit which writes and reads data to and from a plurality of storage media such as magnetic tapes, magneto-optical disks, or the like, and a media storage unit which stores the plurality of storage media in predesignated positions in a media storage rack. The storage media library device also contains in its cabinet a robot which transports the plurality of storage media between the media drive unit and the media storage unit. The robot in the storage media library device is equipped with a detection device such as a CCD (Charge Coupled Device) used to read an identification code, such as a barcode attached to each storage medium, and to measure the relative positions of the robot with respect to the media drive unit and the media storage unit.

Based on the identification code read from each storage medium and the relative positions of the robot measured with respect to the media drive unit and the media storage unit by the detection device such as a CCD, the robot in the storage media library device is operated to take the storage medium from the media loading slot of the media drive unit and transport it for storing in the predesignated position in the media storage rack or to take the storage medium from the predesignated position in the media storage rack and transport it for loading into the media loading slot of the media drive unit (such operation will hereinafter be referred to as the storage media transport operation). The storage media transport operation of the robot is controlled by robot control firmware contained in the cabinet of the device. Various operations of the robot control firmware and storage media read/write operations of the media drive unit are centrally controlled by library control software in the host computer connected to the storage media library device. More specifically, the library control software issues to the robot control firmware a transport command for causing the robot to perform the storage media transport operation. The term "robot control firmware" used here refers to a combination of software and hardware necessary to control the complex mechanical components of the robot.

When a storage medium is being transported by the robot in the conventional storage media library device, if the storage media library device is subjected to vibrations due to the occurrence of an earthquake or the like, an error may occur in the action that the robot is performing to take the storage medium from the media drive unit or the media storage unit or to load or store the storage medium the robot is holding into the media drive unit or the media storage unit. If such an error occurs, the robot control firmware notifies the library control software in the host computer of an error. Upon reception of the error notification, the library control software instructs the robot control firmware to cause the robot to retry the same action (retry action). Then, the robot in the storage media library device tries to recover from the error that occurred during the transport of the storage medium, by performing the retry action a predetermined number of times in accordance with the instruction transferred from the robot control firmware.

When the vibration of the storage media library device caused by an earthquake or the like has subsided in a short time, the error recovery can be accomplished by causing the robot to perform the retry action such as described above. However, when the vibration of the storage media library device has persisted for a long time, if the robot is caused to perform the retry action the predetermined number of times, the storage media transport operation may not be completed normally. As a result, the chance of the storage media library device being caused to go down (i.e., to shut down), and hence the occurrence of a device down error, increases. When such a device down error occurs, a notification is sent to the library control software in the host computer, and the continued use of the storage media library device is rendered impossible under instruction from the library control software.

In this case, the storage media library device cannot be restored unless maintenance personnel (customer engineer (CE)) visits the place where the storage media library device is installed and repairs the storage media library device by replacing the affected unit(s) in the storage media library device and manually performing operations such as measuring the relative positions of the robot with respect to the media drive unit and the media storage unit. The problem is that the storage media library device needs maintenance/repair work carried out by maintenance personnel, which is time and labor consuming.

For reference purposes, Japanese Laid-open Patent Publication Nos. 56-93865 and 03-91157 will be presented below as prior art documents concerning prior art storage media library devices.

Japanese Laid-open Patent Publication No. 56-93865 discloses a cartridge access device for loading/unloading a magnetic tape cartridge and transporting it between a cartridge container and a magnetic recording/reading device by using an access mechanism, wherein the cartridge access device is equipped with a device for stopping the operation of the access mechanism upon detecting vibrations caused by an earthquake or the like. It is described that an accelerometer is provided as the device for stopping the operation of the access mechanism. However, in Japanese Laid-open Patent Publication No. 56-93865, no description is given as to the specific shape, mounting position, etc. of the accelerometer. Besides, in Japanese Laid-open Patent Publication No. 56-93865, no mention whatsoever is made of how the operation of the access mechanism is resumed by measuring the relative positions of the access mechanism with respect to the cartridge container and the magnetic recording/reading device and correcting any displacements in the relative positions after the vibrations caused by an earthquake or the like have subsided.

Japanese Laid-open Patent Publication No. 03-91157 discloses a control method for a cartridge library device comprising a recording/reproduction unit which records and reproduces data on a cartridge-type recording medium, an accessor robot which automatically retrieves a selected cartridge from a container means containing a large number of cartridges and stores a selected cartridge in the container means, and a means for detecting seismic levels, wherein when an earthquake occurs, if the seismic level is lower than a specified value, the operation of the accessor robot is temporarily stopped and is resumed after the earthquake has subsided, but if the seismic level is higher than the specified value, a device failure notification is sent to a host system.

While it is described in Japanese Laid-open Patent Publication No. 03-91157 that a seismic sensor is used as the means for detecting seismic levels, no description is given as to the specific shape, mounting position, etc. of the seismic sensor. Besides, in Japanese Laid-open Patent Publication No. 03-91157, no mention whatsoever is made of how the operation of the accessor robot is resumed by measuring the relative positions of the accessor robot with respect to the recording/reproduction unit and the container means and correcting any displacements in the relative positions after the earthquake has subsided.

As a result, neither Japanese Laid-open Patent Publication No. 56-93865 nor No. 03-91157 can address the problems that occur when vibrations due to an earthquake or the like are encountered when a plurality of storage media such as magnetic tapes are being transported by the access mechanism or the accessor robot or the like using the prior art techniques.

SUMMARY

In view of the above problems, it is an object of an embodiment to provide a storage media library device that allows the continued use of the device without maintenance personnel having to perform maintenance/repair work such as replacement of affected units or measurement of the relative positions in the case where vibrations due to an earthquake or the like occur while a plurality of storage mediums are being transported by the robot in the storage media library device, and also provide a control method for such a storage media library device and a program for implementing the same.

According to an aspect of the embodiment, a storage media library device includes a media drive unit which writes and reads information on a plurality of storage media, a media storage unit which stores the storage media in a media storage rack, a robot which is operated to transport the storage media between the media drive unit and the media storage unit, an identification code/relative position detection unit which detects an identification code attached to each of the storage media and also detects relative positions of the robot with respect to the media drive unit and the media storage unit, a robot control unit which controls the storage media transport operation of the robot based on the identification code and the relative positions detected by the identification code/relative position detection unit, and a vibration detection unit which detects occurrence of vibrations. The storage media library device is connected to a host computer having a library control unit which controls various operations of the media drive unit and the robot control unit, wherein when the robot is performing the storage media transport operation, if occurrence of vibrations is detected by the vibration detection unit, the robot control unit causes the robot to temporarily stop the storage media transport operation and puts the robot in a standby state, and when the vibration detection unit has detected that the vibrations have subsided within a predefined time period preset in a storage media transport command and monitored by the library control unit, the robot control unit causes the robot to resume the storage media transport operation.

According to another aspect of the embodiment, a storage media library device includes a media drive unit which writes and reads information on a plurality of storage media, a media storage unit which stores the storage media in a media storage rack, a robot which is operated to transport the storage media between the media drive unit and the media storage unit, an identification code/relative position detection unit which detects an identification code attached to each of the storage media and also detects relative positions of the robot with respect to the media drive unit and the media storage unit, a robot control unit which controls the storage media transport operation of the robot based on the identification code and the relative positions detected by the identification code/relative position detection unit, and a vibration detection unit which detects occurrence of vibrations. The storage media library device is connected to a host computer having a library control unit which controls various operations of the media drive unit and the robot control unit, wherein when the robot is performing the storage media transport operation, if occurrence of vibrations is detected by the vibration detection unit, the robot control unit causes the robot to temporarily stop the storage media transport operation and puts the robot in a standby state, and when the vibration detection unit has detected that the vibrations have subsided within a predefined time period preset in a storage media transport command and monitored by the library control unit, the robot control unit corrects any displacements in the relative positions based on the relative positions detected by the identification code/relative position detection unit, and thereafter causes the robot to resume the storage media transport operation.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF DRAWINGS

The present invention will be more clearly understood from the description as set below with reference to the accompanying drawings, wherein.

DESCRIPTION OF EMBODIMENT(S)

The configuration, operation, etc., of a storage media library device according to an embodiment will be described below with reference to the accompanying drawings.

Figure 1:
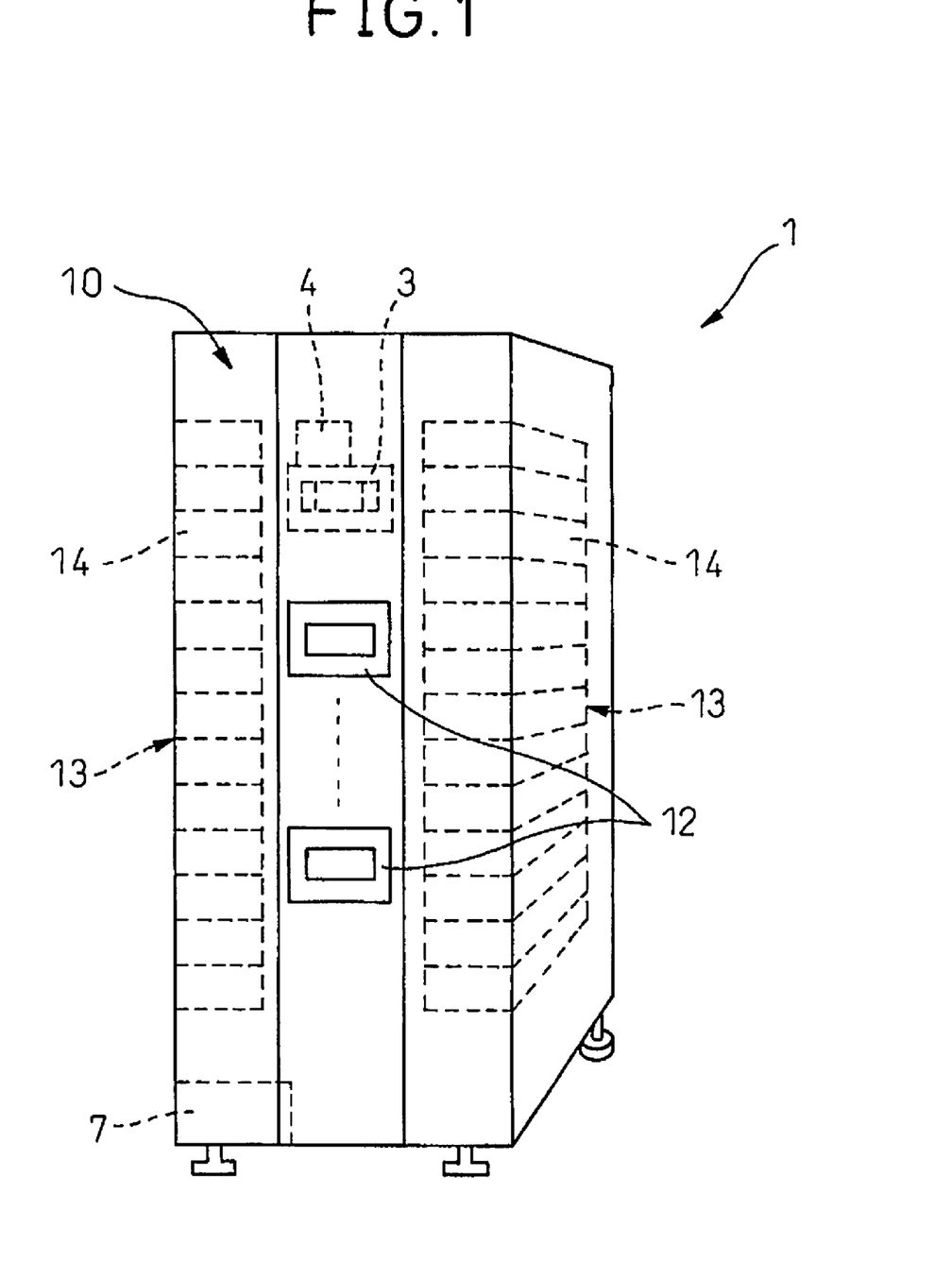
FIG. 1 is an external view of a storage media library device according to an embodiment.
Figure 2:
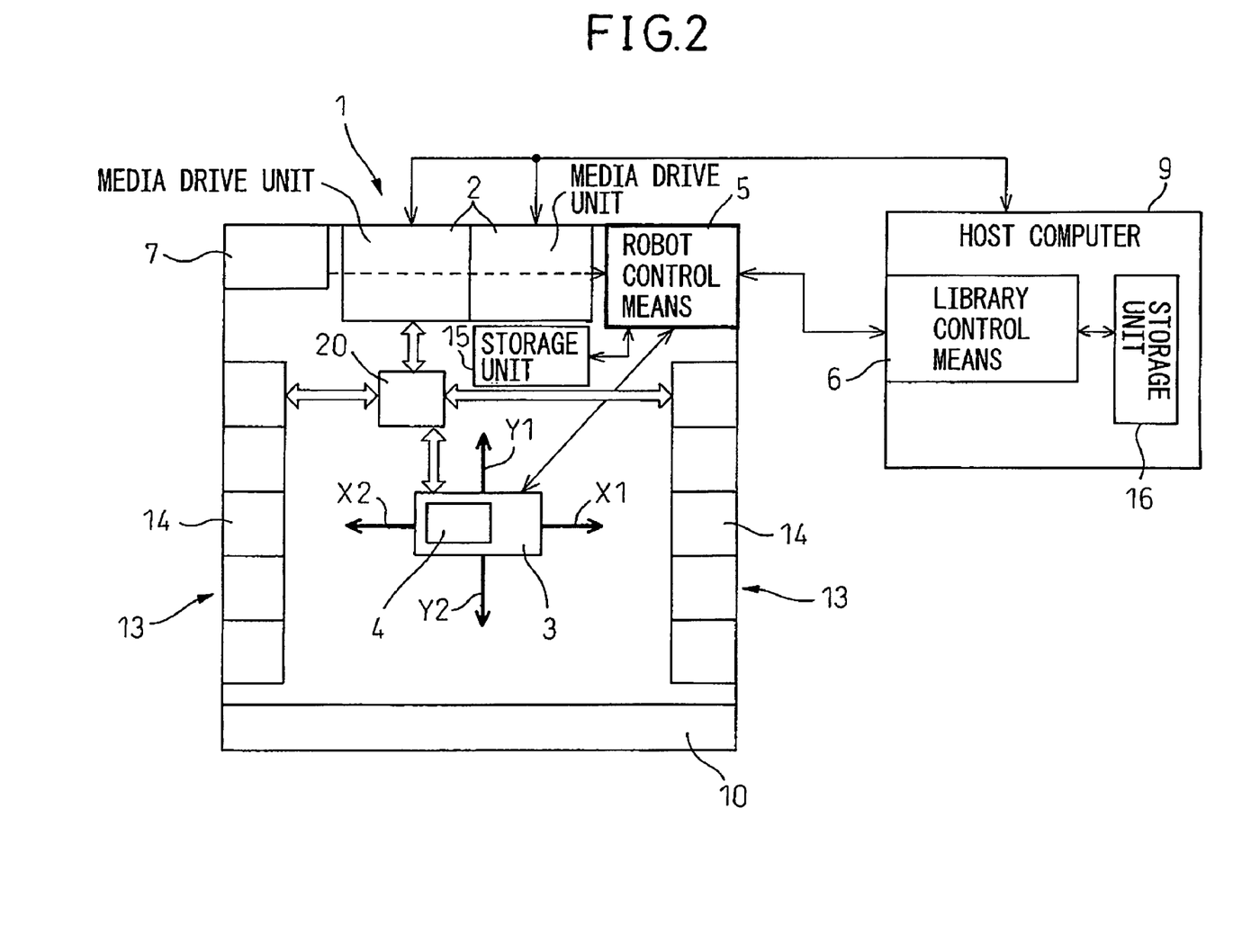
FIG. 2 is a plan view showing the interior of the storage media library device according to the embodiment when the device is viewed from the top thereof.
Figure 3:
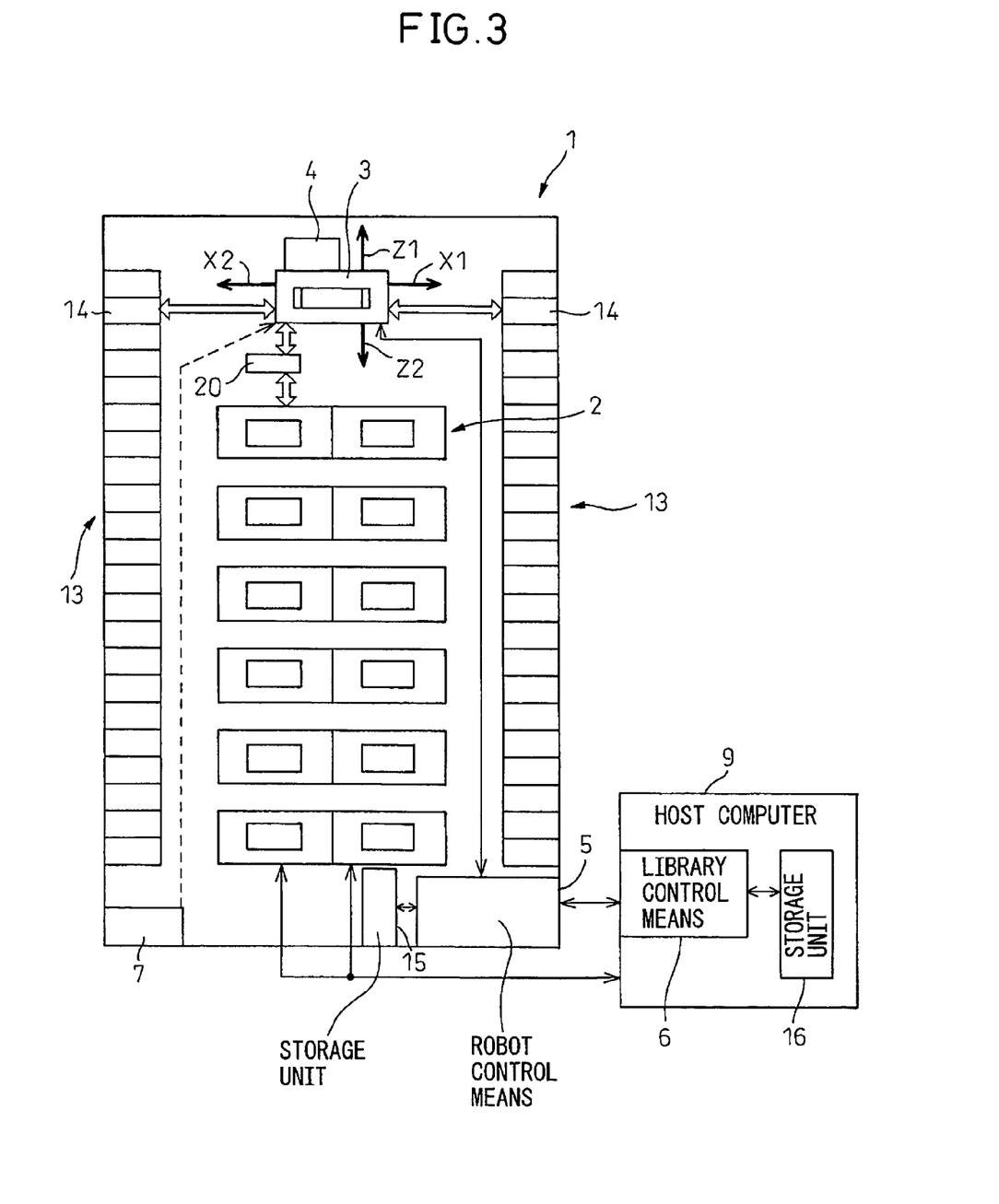
FIG. 3 is a front view showing the interior of the storage media library device according to the embodiment when the device is viewed from the front side thereof.

FIG. 1 is an external view of the storage media library device according to the embodiment, FIG. 2 is a plan view showing the interior of the storage media library device according to the embodiment when the device is viewed from the top thereof, and FIG. 3 is a front view showing the interior of the storage media library device according to the embodiment when the device is viewed from the front side thereof. Throughout the drawings given herein, like component elements are designated by like reference numerals.

In the external view of the storage media library device 1 according to the embodiment of FIG. 1, there is depicted a device front panel 10 which forms the front part of the device cabinet. The device front panel 10 is provided with media receiving slots 12 through which users, etc., deposit a plurality of storage media such as magnetic tapes or magneto-optical disks into the device cabinet. The storage media deposited through the media receiving slots 12 are recovered by a robot 3 installed in the device cabinet. To protect the various component elements contained in the device cabinet (such as the robot 3, barcode/relative-position flag reading unit 4, media storage unit 13, and vibration detection unit 7) during the operation of the storage media library device 1, the device front panel 10 remains locked, except when maintenance personnel accesses it for repair or maintenance, and usually the interior of the storage media library device 1 is hidden from view. However, to explain in detail the structure inside the cabinet of the storage media library device 1 according to the embodiment, a plan view showing the interior of the storage media library device 1 as viewed from the top thereof and a front view showing the interior of the storage media library device 1 as viewed from the front side thereof are depicted in FIGS. 2 and 3, respectively.

The storage media library device 1 according to the embodiment of FIGS. 2 and 3 contains in its cabinet a media drive unit (media drive) 2 which writes and read data to and from a plurality of storage media 20 such as magnetic tapes, magneto-optical disks, or the like, and a media storage unit 13 which stores the plurality of storage media 20 in predesignated positions in a media storage cell (media storage rack) 14. The media drive unit 2 and the media storage unit 13 respectively correspond to the media drive unit and the media storage unit provided in the storage media library device.

Further, as earlier described, the robot 3 for transporting the plurality of storage media 20 between the media drive unit 2 and the media storage unit 13 is installed in the cabinet of the storage media library device 1 according to the embodiment of FIGS. 2 and 3. The barcode/relative-position flag reading unit 4 containing a detection device such as a CCD is mounted to the robot 3 installed in the storage media library device 1. The barcode/relative-position flag reading unit 4 corresponds to the identification code/relative position detection unit provided in the storage media library device claimed. The barcode/relative-position flag reading unit 4 has the function of reading the identification code such as a barcode attached to each individual storage medium 20, the positioning flag attached near the media loading slot of the media drive unit 2, and the positioning flag attached to a designated portion of each media storage rack 14 in the media storage unit 13, in order to measure the relative positions of the robot 3 with respect to the media drive unit 2 and the media storage unit 13.

More specifically, based on the identification code of the storage medium 20 and the positioning flags of the media drive unit 2 and media storage unit 13 read by the barcode/relative-position flag reading unit 4, and on the relative positions of the robot 3 measured with respect to the media drive unit 2 and the media storage unit 13, the robot 3 in the storage media library device 1 is operated to take the storage medium 20 from the media loading slot of the media drive unit 2 and transport it for storing in the predesignated position in the media storage cell 14 or to take the storage medium 20 from the predesignated position in the media storage cell 14 and transport it for loading into the media loading slot of the media drive unit 2 (the transport operation for the storage medium 20).

The storage media library device 1 according to the embodiment of FIGS. 2 and 3 further contains in its cabinet a robot control unit 5 which functions as robot control firmware for controlling the transport operation of the robot 3 transporting the storage medium 20, and a storage unit 15 which includes a ROM (Read-Only Memory) or a RAM (Random Access Memory) or the like. The robot control firmware is a combination of software necessary to control the complex mechanical components of the robot 3 and hardware, including a control circuit for the robot 3, mounted on a printed circuit board or the like.

The software function of the robot control unit 5 is implemented by executing a program necessary for control of the storage media transport operation of the robot by using a CPU (Central Processing Unit) of a general-purpose computer contained in the device cabinet. More specifically, the CPU reads out the program, stored in the ROM or the like in the storage unit 15, for controlling the storage media transport operation, and the various kinds of data stored in the RAM or the like necessary for the execution of the program, and executes the program to implement the software function of the robot control unit 5. Instead of the ROM or RAM contained in the storage unit 15, the ROM or RAM built into the CPU may be used.

Further, as depicted in FIGS. 2 and 3, a host computer 9 as a host system for the storage media library device 1 is connected to the storage media library device 1. The host computer 9 includes a library control unit 6 which functions as library control software for centrally controlling the various kinds of operations related to the control of the robot 3 performed by the robot control unit 5 and the read/write operations performed on the storage medium 20 by the media drive unit 2, and a storage unit 16 which includes a ROM or a RAM or the like. More specifically, the library control unit 6 issues to the robot control unit 5 a transport command for causing the robot 3 to operate to transport the storage medium 20 and a read/write command (R/W command) for causing the media drive unit 2 to operate to read or write data to the storage medium 20.

The software function of the library control unit 6 is implemented by executing a program necessary for controlling the various operations of the robot control unit 5 and the read/write operations of the media drive unit 2 by using the CPU of the host computer 9. More specifically, the CPU reads out the program, stored in the ROM or the like in the storage unit 16, for controlling the various operations of the robot control unit 5 and the read/write operations of the media drive unit 2, and the various kinds of data stored in the RAM or the like necessary for the execution of the program, and executes the program to implement the software function of the library control unit 6. Here, instead of the ROM or RAM contained in the storage unit 16, the ROM or RAM built into the CPU may be used.

The storage media library device 1 according to the embodiment of FIGS. 2 and 3 further contains in its cabinet a vibration detection unit 7 realized by a vibration detection sensor or the like for detecting the occurrence of vibrations associated with an earthquake or the like. In the embodiment depicted here, the vibration detection sensor as the vibration detection unit 7 is installed near the media drive unit 2 located in the lower part of the device cabinet, but instead, the vibration detection sensor may be installed near the media drive unit 2 located in the upper part of the device cabinet. It is to be understood here that the vibration detection sensor is constantly monitored by the robot control firmware when the storage media library device 1 is in operation.

Preferably, a seismic intensity meter equipped with a three-axis (front-to-back, right-and-left, and up-and-down) acceleration sensor is used as the vibration detection sensor to be mounted in the device cabinet. Here, the vibration refers to the state in which an object repeats back-and-forth, right-and-left, or up-and-down motions centered about a given point. The vibration detection sensor assumes that a weight contained in the seismic intensity meter is a "stationary point," and measures the back-and-forth or right-and-left shaking of the ground surface, due to vibrations caused by an earthquake or the like, as relative displacements. On the other hand, shaking in the up-and-down directions is detected by utilizing the expansion and contraction of a spring on which a weight is suspended. More specifically, the back-and-forth or right-and-left shaking of the ground surface and the up-and-down shaking causing the spring to expand and contract are detected by the acceleration sensor contained in the seismic intensity meter.

Generally, in the storage media library device, when a storage medium is being transported by the robot, if vibrations occur due to an earthquake or the like, the transport operation tends to be adversely affected as the robot becomes unable to properly remove the storage medium from the media drive unit or the media storage unit or unable to properly load the storage medium the robot is holding into the media drive unit or the media storage unit, because of the shaking of the robot itself.

To address such an adverse situation, in the storage media library device 1 according to the embodiment of FIGS. 2 and 3, when a storage medium is being transported by the robot 3, if vibrations associated with an earthquake or the like are detected by the vibration detection sensor, the robot control firmware is activated, causing the robot 3 to temporarily stop the storage media transport operation and thus putting the robot 3 in a standby state. In this case, the robot 3 is made to appear to the library control software as if the robot 3 were continuing the storage media transport operation.

A timeout as a predefined time interval is preset in the storage media transport command that the library control software issues to the storage media library device 1. The library control software monitors whether the storage media transport operation of the robot 3 is completed before the timeout interval expires. The robot control firmware controls the robot 3 so that the robot 3 resumes and completes the media transport operation before the timeout interval expires. During the period that the robot 3 is held in the standby state, if it is expected that the timeout period (the predefined time interval) will expire before the robot 3 resumes and completes the media transport operation after resuming the transport operation, the robot control firmware notifies the library control software that abnormality has occurred to the storage media library device 1 (abnormal termination). The storage media library device 1 requests the library control software to perform a retry operation upon receiving the notification, as a result of which it may become possible to terminate the operation normally. The library control software is created so that it can perform the retry operation at a time earlier than the time that the robot control firmware performs the retry operation upon detection of the expiration of the timeout interval. The robot control firmware is created to determine whether the timeout interval is likely to expire or not by checking the time required from the moment the transport operation of the robot 3 is resumed to the moment the transport operation is completed, based on the time elapsed from the reception of the command (the timeout period is also known), the time required to move the robot from the current position to the target position (the position of the media storage cell or the media drive unit), the time required for various processing operations, etc.

On the other hand, when the predefined timeout interval is not likely to expire during the period from the time the transport operation of the robot 3 is resumed to the time the transport operation is completed, if the vibration detection sensor has detected that the vibrations associated with an earthquake or the like have subsided, the robot control firmware causes the robot 3 to resume the storage media transport operation. At this time, there is no need to reissue the storage media transport command from the library control software, since the library control software assumes that the robot 3 has been continuing the transport operation.

However, when the transport operation of the robot 3 is resumed, displacements may have occurred in the relative position between the robot 3 and the media drive unit 2 or between the robot 3 and the media storage unit 13 because of the vibrations and the initializing action of the robot 3. To address this, the robot control firmware measures the relative positions of the robot 3 with respect to the media drive unit 2 and the media storage unit 13 by using the barcode/relative-position flag reading unit 4 (for example, a detection device such as a CCD), and acquires relative position correction data to correct any displacements caused in the relative positions. After correcting the relative position displacements, the robot control firmware causes the robot 3 to resume the transport operation.

Preferably, in the storage media library device 1 according to the embodiment, the monitoring as to whether the timeout interval is likely to expire or not, which is constantly performed by the library control unit until the vibrations associated with an earthquake or the like subside, is performed by considering the robot initialization time required to initialize the robot after the vibrations have subsided, the relative position correcting time required to correct the displacements in the relative positions of the robot 3 with respect to the media drive unit 2 and the media storage unit 13, and the remaining time left for the completion of the storage media transport operation of the robot 3.

In the storage media library device 1 according to the embodiment, it is important that, upon detecting the occurrence of vibrations caused by an earthquake or the like, the robot 3 be immediately moved to a safe place to prevent it from hitting and damaging other component elements in the storage media library device 1 due to the shaking of the robot itself. Preferably, upon detecting the occurrence of vibrations, the robot control firmware performs control to move the robot 3 to a safe place where the robot 3 does not come into contact with the media storage unit 13, the media drive unit 2, etc. by controlling the back-and-forth motion (in directions of Y1 and Y2 in FIGS. 2 and 3), right-and-left motion (in directions of X1 and X2 in FIGS. 2 and 3), up-and-down motion (in directions of Z1 and Z2 in FIG. 3), and rotational motion of the robot 3.

When the robot 3 is performing the transport operation for transporting the storage medium, if the occurrence of vibrations is detected when the robot 3 is about to place the storage medium into the media storage unit 13 or the media drive unit 2, the robot control firmware controls the transport operation of the robot 3 so as to draw the storage medium back into the robot 3; on the other hand, if the occurrence of vibrations is detected when the robot 3 is about to remove the storage medium from the media storage unit 13 or the media drive unit 2, the robot control firmware performs control so as to retract only the hand of the robot 3 while leaving the storage medium intact. In other words, the robot control firmware controls the operation of the robot 3 so that the storage medium is always brought to a safe place by giving first consideration to the safety of the user's storage medium. The control of the operation of the robot 3 in an emergency will be described later.

Preferably, in the storage media library device 1 according to the embodiment, the vibration detection sensor also has the function of detecting the magnitude of shaking caused by vibrations associated with an earthquake or the like. When the magnitude of shaking detected by the vibration detection sensor is smaller than a threshold, the robot control firmware causes the robot 3 to resume the storage media transport operation from the standby state. On the other hand, when the magnitude of shaking detected by the vibration detection sensor is larger than the threshold, since not only the robot but also other component elements in the storage media library device 1 may suffer damage, the robot control firmware immediately puts the storage media library device 1 in the down state, and notifies the library control software of the occurrence of abnormality (abnormal termination).

When the vibrations associated with an earthquake or the like have subsided, it is highly likely that displacements are caused in the relative position of the robot 3 with respect to the media drive unit 2 or the media storage unit 13 because of such factors as the strains applied to the component elements in the storage media library device 1. To address such an adverse situation, the relative positions of the robot 3 with respect to the media drive unit 2 and the media storage unit 13 are measured using the barcode/relative-position flag reading unit 4 (for example, a detection device such as a CCD). However, the storage medium may be protruding from the media storage cell 14. It is therefore preferable that the robot control firmware causes the robot to perform the action of pushing the storage medium back into the media storage cell 14. By performing this pushing action, it can be determined whether the storage medium has fallen off the media storage cell 14 or not. If it is determined that the storage medium has fallen off, the storage media library device 1 is immediately put in the down state thereby preventing the storage medium, the robot 3, the media storage cell 14, etc., from being damaged.

Further, when the vibrations associated with an earthquake or the like have subsided, it is preferable to check whether or not the storage medium is protruding from the media storage cell 14 by using the detection device such as a CCD mounted to the robot 3. Based on the result of the detection, the robot control firmware corrects any relative position displacements by avoiding the position of the storage medium protruding from the media storage cell 14, and thereafter causes the robot 3 to perform the action of pushing the protruding storage medium back into the media storage cell 14. By measuring the relative position so as to avoid the position of the storage medium protruding from the media storage cell 14, as described above, the pushing action with highly accurate positioning can be accomplished, and the storage medium, the robot 3, the media storage cell 14, etc. can thus be prevented further effectively from being damaged.

According to the storage media library device of the embodiment depicted in FIGS. 1 to 3, by implementing the control using the robot control firmware and the library control software as described above, the chance that the storage media library device can autonomously avoid the abnormality of the device and resume the operation of the storage media library device increases, even in situations that, in the prior art, caused abnormal termination and necessitated maintenance personnel performing maintenance/repair work, such as the replacement of affected units and the manual measurements of the relative positions, before resuming the operation of the storage media library device. This serves to reduce the frequency of service calls, and it is thus expected that the utilization rate of the storage media library device will increase.

Figure 4:
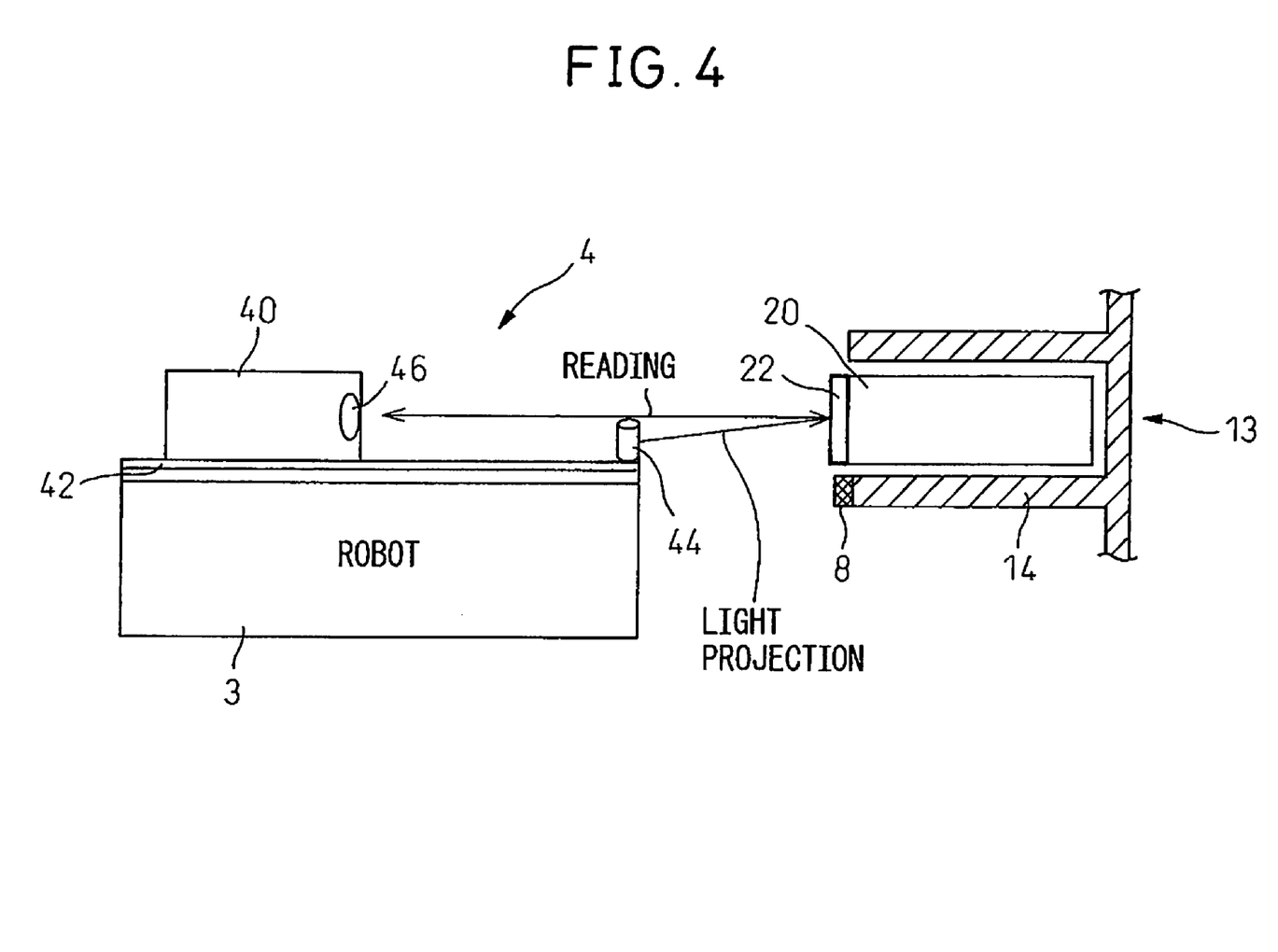
FIG. 4 is a schematic diagram showing the relationship between a robot and a barcode/relative-position flag reading unit.

FIG. 4 is a schematic diagram showing the relationship between the robot and the barcode/relative-position flag reading unit. A detailed description will be given below of how the relative position between the robot 3 and the media storage unit 13 (or the media drive unit) is measured using the barcode/relative-position flag reading unit 4 in the storage media library device according to the embodiment.

As depicted in FIG. 4, the barcode/relative-position flag reading unit 4 having a barcode/relative-position flag detection device 40 such as a CCD is mounted to the robot 3 in the storage media library device. On the other hand, a barcode 22 as an identification code for identifying each individual storage medium is attached to a designated portion of each storage medium 20. A positioning flag 8 is attached to a designated portion of each media storage cell 14 in the media storage unit 13. Though not depicted in FIG. 4, a positioning flag is attached near the media loading slot of each media drive unit 2 (see FIGS. 2 and 3). The barcode/relative-position flag detection device 40 is mounted on a printed circuit board 42 which is mounted on the upper surface of the robot 3.

In further detail, a light-emitting unit 44 for projecting a light from a light source such as an LED (Light Emitting Diode) onto the barcode 22, positioning flag 8, etc. is mounted on an end portion of the printed circuit board 42. On the other hand, a light-receiving unit 46 for reading information on the barcode 22, positioning flag 8, etc., by receiving light reflected from the barcode 22, positioning flag 8, etc. is mounted at the front of the barcode/relative-position flag detection device 40. The barcode/relative-position flag detection device 40 measures the time that elapses from the moment the light of the LED or the like is emitted from the light-emitting unit 44 to the moment the light reflected from the barcode 22, positioning flag 8, etc., is received by the light-receiving unit 46, and computes the relative position of the robot 3 with respect to the media storage unit 13 (or the media drive unit) based on the relation between the measured time and the speed of light.

Figure 5:
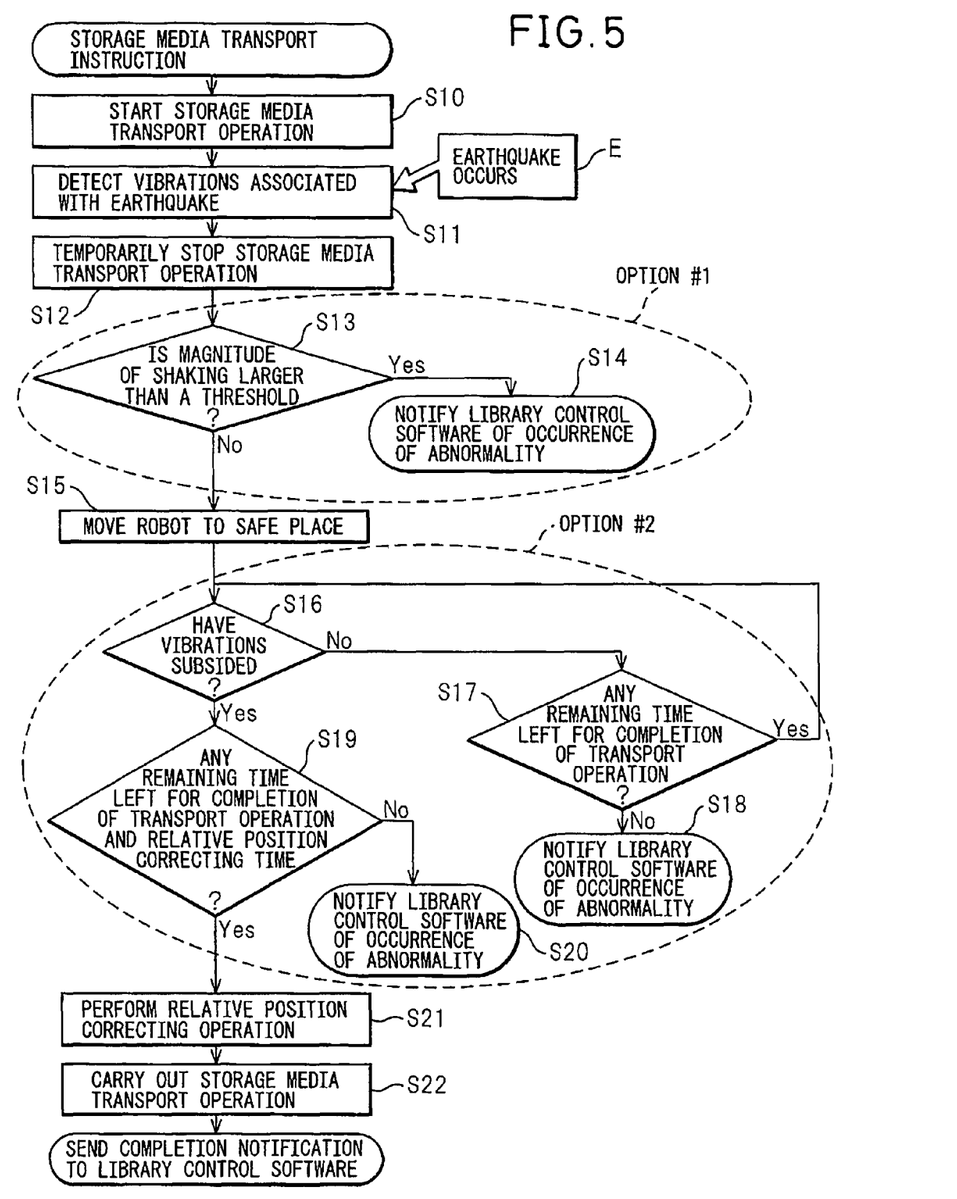
FIG. 5 is a flowchart explaining a method for controlling the storage media library device according to the embodiment.

FIG. 5 is a flowchart for explaining a method for controlling the storage media library device according to the embodiment. A process flow will be described which is carried out to control the storage media transport operation of the robot by operating the CPU of the computer contained in the storage media library device.

First, as depicted in step S10 in FIG. 5, the storage media transport operation of the robot is started in accordance with the storage media transport instruction (transport command) issued from the library control software.

Next, if an earthquake occurs during the storage media transport operation of the robot, as depicted in block E, the occurrence of vibrations associated with the earthquake is detected in step S11 by the vibration detection sensor.

When the occurrence of vibrations associated with the earthquake is detected, the CPU in step S12 causes the storage media transport operation of the robot to stop temporarily, and puts the robot in the standby state.

In step S13, it is detected by the vibration detection sensor whether the magnitude of shaking due to the vibrations caused by the earthquake is large or not. If it is detected that the magnitude of shaking is relatively large, the process proceeds to step S14 where the storage media library device is put in the down state and the library control software is notified of the occurrence of abnormality. The process flow in the above steps S13 and S14 is carried out only when the user has chosen to use the vibration detection sensor having the function of detecting the magnitude of shaking caused by vibrations (option #1).

On the other hand, if it is detected that the magnitude of shaking is relatively small, the process proceeds to step S15, where control is performed so that the robot in the standby state is moved to a safe place where it does not come into contact with the media storage unit, the media drive unit, etc.

In step S16, it is detected by the vibration detection sensor whether the vibrations caused by the earthquake have subsided or not. If it is detected that the vibrations have not yet subsided, the process proceeds to step S17, where the timeout period being monitored by the library control software is checked to see whether there is any remaining time left for the completion of the storage media transport operation of the robot.

If it is determined that there is no remaining time left for the completion of the storage media transport operation, the process proceeds to step S18 to notify the library control software that abnormality has occurred to the storage media library device.

On the other hand, if it is determined that there is remaining time left for the completion of the storage media transport operation, the process returns to step S16, where it is detected by the vibration detection sensor whether the vibrations caused by the earthquake have subsided or not. If it is detected that the vibrations have subsided, the process proceeds to step S19, where the timeout period being monitored by the library control software is checked to see whether there is any remaining time left for the completion of the storage media transport operation of the robot as well as the relative position correcting time required to correct any displacements in the relative positions of the robot with respect to the media drive unit and the media storage unit.

If it is determined that there is neither any remaining time left for the completion of the storage media transport operation of the robot nor any relative position correcting time, the process proceeds to step S20 to notify the library control software that abnormality has occurred to the storage media library device. The process flow in the above steps S16 to S20 is carried out only when the timeout period is set by considering the relative position correcting time and the remaining time left for the completion of the storage media transport operation of the robot (if necessary, also considering the robot initialization time required to initialize the robot after resuming the transport operation) (option #2).

If it is determined that there is remaining time left for the completion of the storage media transport operation of the robot as well as the relative position correcting time, the process proceeds to step S21, where the relative positions of the robot with respect to the media drive unit and the media storage unit are measured using the detection device such as a CCD mounted to the robot, to perform the relative position correcting operation for correcting the displacements in the relative positions.

After correcting the displacements in the relative positions of the robot with respect to the media drive unit and the media storage unit in step S21, the process proceeds to step S22 to resume the storage media transport operation of the robot. When the storage media transport operation is completed, the CPU notifies the library control software that the storage media transport operation is completed.

Figure 6:
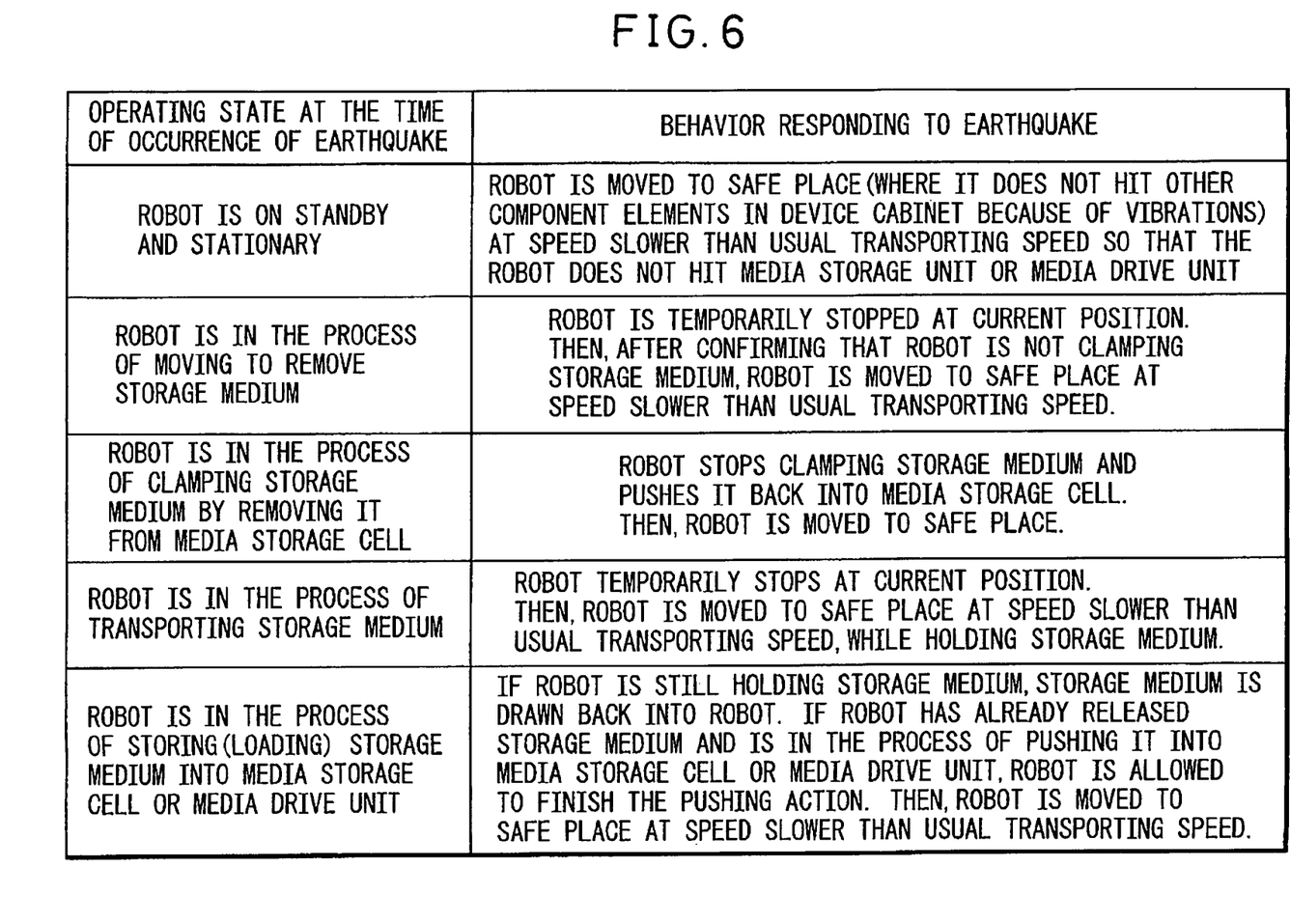
FIG. 6 is a diagram showing the relationship between the state of the storage media transport operation and the emergency control operation of the robot in the event of the occurrence of an earthquake.

FIG. 6 is a diagram showing the relationship between the state of the storage media transport operation and the emergency control operation of the robot in the event of the occurrence of an earthquake. It is depicted here how the behavior of the robot responding to the earthquake is changed in accordance with the operating state at the time of the occurrence of the earthquake. It is to be noted here that the storage media library device usually has a plurality of speed modes defining the speed of the robot.

As depicted in FIG. 6, the robot control firmware performs control so that the robot is operated to bring the storage medium to a safer place (emergency control operation) in accordance with the storage media transport operation being performed by the robot when the occurrence of vibrations associated with the earthquake is detected.

More specifically, the robot control firmware controls the robot in the following manner; first, when the robot is on standby and is stationary, the robot is moved to a safe place (where it does not hit other component elements in the device cabinet because of vibrations) slowly (for example, at a speed slower than the usual transporting speed) so that the robot does not hit the media storage cell of the media storage unit or the media drive unit. Second, when the robot is in the process of moving toward the media storage cell or the media drive unit to remove a storage medium from it, the robot is temporarily stopped at the current position. Then, after confirming that the robot is not clamping the storage medium, the robot is moved to a safe place slowly (for example, at a speed slower than the usual transporting speed).

Third, when the robot is in the process of clamping the storage medium by removing it from the media storage cell (or the media drive unit), the robot stops clamping the storage medium and pushes it back into the media storage cell, after which the robot is moved to a safe place. Fourth, when the robot is in the process of transporting the storage medium, the robot temporarily stops at the current position, after which the robot is moved to a safe place slowly (for example, at a speed slower than the usual transporting speed) while holding the storage medium.

Fifth, when the robot is in the process of storing (loading) the storage medium into the media storage cell or the media drive unit, if the robot is still holding the storage medium, the storage medium is drawn back into the robot. On the other hand, if the robot has already released the storage medium and is in the process of pushing it into the media storage cell or the media drive unit, the robot is allowed to finish the pushing action, after which the robot is moved to a safe place slowly (for example, at a speed slower than the usual transporting speed).

Figure 7:
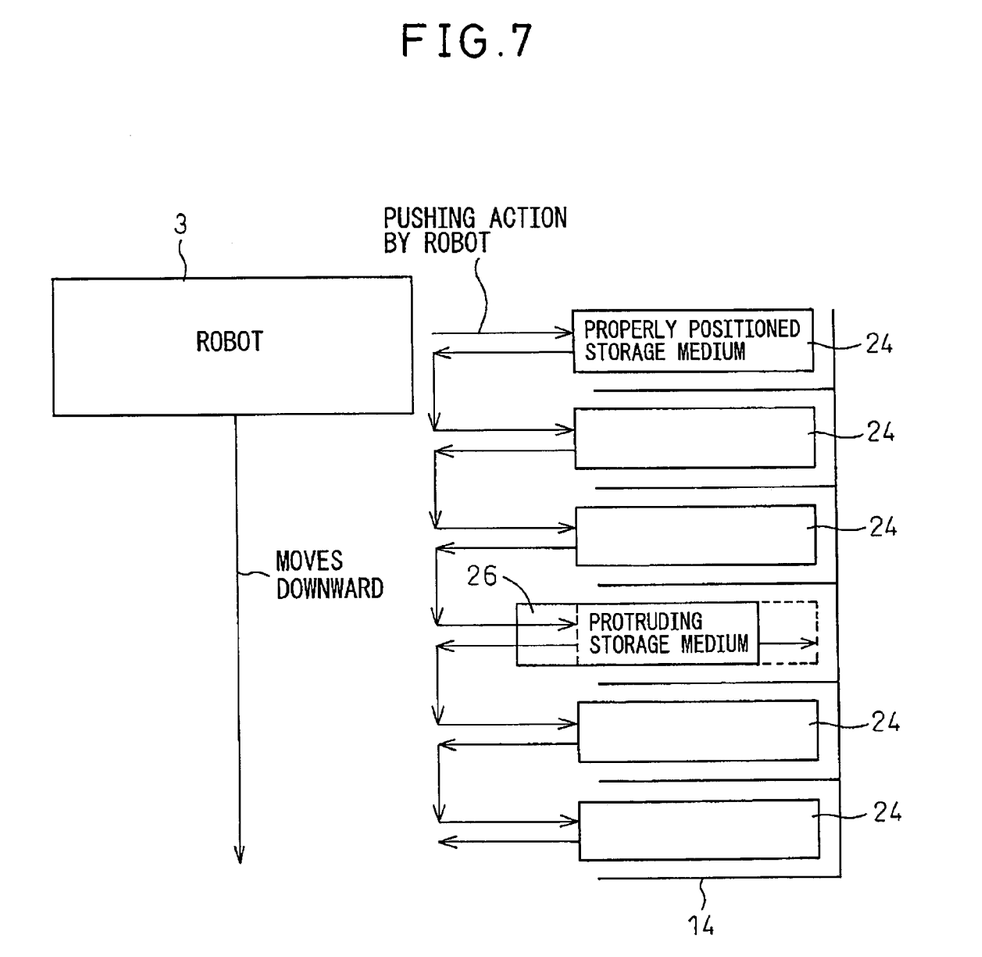
FIG. 7 is a schematic diagram explaining how the robot is operated to push storage media into media storage cells after vibrations have subsided.

FIG. 7 is a schematic diagram for explaining how the robot is operated to push the storage medium into the media storage cell after the vibrations have subsided. In the storage media library device according to the embodiment, when the vibrations associated with an earthquake or the like have subsided, it is likely that displacements are caused in the relative position of the robot with respect to the media drive unit or the media storage unit because of such factors as the strains applied to the component elements in the storage media library device. Further, the storage medium may be protruding from the media storage cell 14 due to the vibrations, as depicted in FIG. 7.

To address this, the robot control firmware causes the robot to perform the pushing action to push the protruding storage medium 26 back into the media storage cell 14. More specifically, while moving the robot 3 downward (or upward), a pulse motor or the like built into the robot 3 is driven to operate the hand of the robot 3 so as to push the storage media, including the properly positioned storage media 24 and the protruding storage medium 26, one after another into their respective corresponding media storage cells 14, thereby accomplishing the pushing action of the robot 3. Here, each time the robot 3 performs the pushing action on each individual media storage cell 14, the number of revolutions of the pulse motor is counted. When the pushing action is performed on a given media storage cell 14, if the number of revolutions of the pulse motor built into the robot 3 is larger than a predetermined value, the robot control firmware determines that the storage medium that should be held in the media storage cell 14 had fallen from the media storage cell 14 onto the bottom floor of the device cabinet.

If it is determined that the storage medium had fallen off the media storage cell 14, the storage media library device is immediately put in the down state thereby preventing the storage medium on the bottom floor of the device cabinet, the robot 3, the media storage cell 14, etc., from being damaged.

On the other hand, if it is determined that the storage medium had not fallen off the media storage cell 14, the robot control firmware measures the relative positions of the robot 3 with respect to the media drive unit and the media storage unit by using the barcode/relative-position flag reading unit such as a CCD, and corrects any displacements in the relative positions, after which the robot control firmware causes the robot 3 to resume the storage media transport operation.

Figure 8:
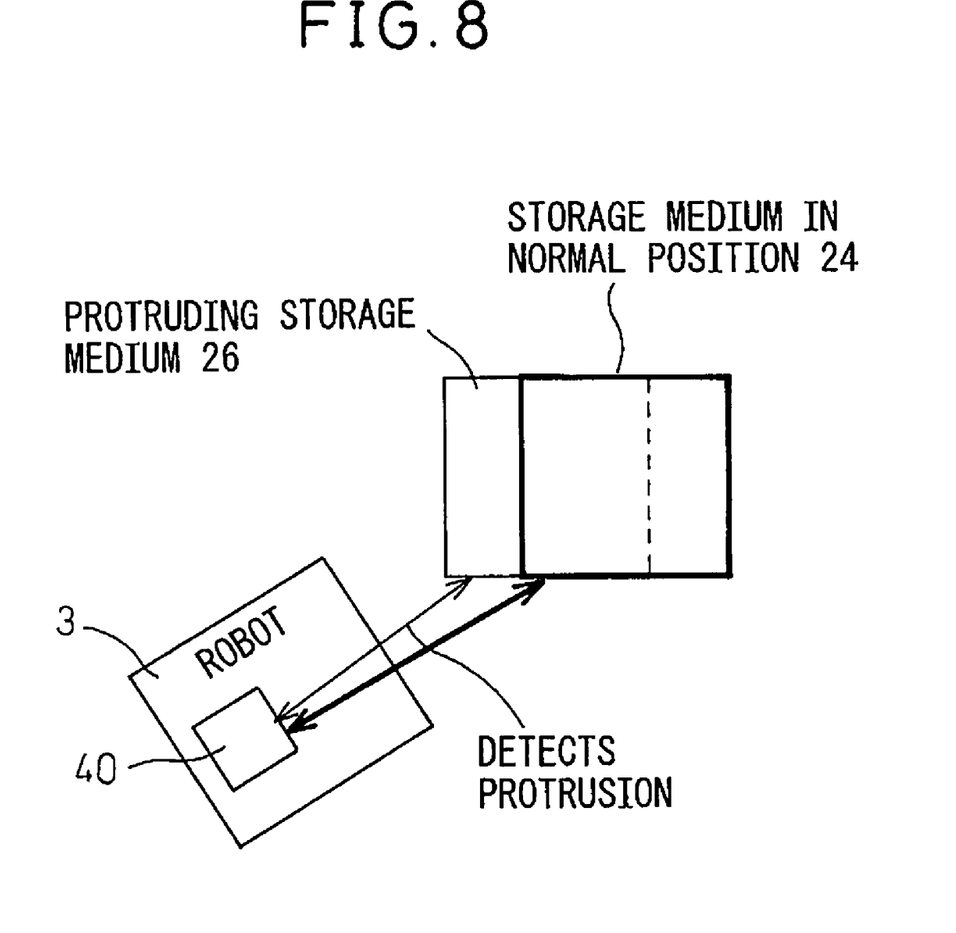
FIG. 8 is a schematic diagram for explaining how a protruding storage medium is detected after vibrations have subsided.

FIG. 8 is a schematic diagram for explaining how the protruding storage medium is detected after the vibrations have subsided. As earlier described, when the vibrations associated with an earthquake or the like have subsided, the storage medium may be protruding from the media storage cell 14 in the media storage unit (see FIG. 7). In this case, when the relative positions of the robot 3 are measured with respect to the media drive unit and the media storage unit by using the barcode/relative-position flag reading unit 40 such as a CCD, and the relative position correcting operation for correcting the relative position displacements is performed based on the measurements, the robot 3 may come into contact with the protruding storage medium 26, damaging the storage medium, the robot 3, etc.

To address this, the robot control firmware first checks the protruding storage medium from a direction at an angle to the front of the media storage cell (see FIG. 7) by using the barcode/relative-position flag reading unit 40 such as a CCD, and then measures the relative position based on the normal position of the storage medium 24 by avoiding the position of the storage medium (the protruding storage medium 26) detected protruding from the media storage cell 14. After that, the robot 3 is caused to push the protruding storage medium 26 back into its storage cell; in this way, the pushing action with highly accurate positioning can be accomplished, and the storage medium, the robot 3, the media storage cell, etc. can be prevented further effectively from being damaged.

As disclosed herein, according to the storage media library device, the control method for the storage media library device, and the program for implementing the same, when a plurality of storage media are being transported by the robot in the storage media library device, if vibrations associated with an earthquake or the like are detected by the vibration detection unit such as a vibration detection sensor installed at a designated position within the storage media library device, the robot control firmware, etc., cause the robot to temporarily stop the transport operation, and put the robot in a standby state, and when it is detected that the vibrations have subsided within a predefined time period preset in the storage media transport command and monitored by the library control software, etc., the storage media transport operation of the robot is automatically resumed without having to reissue the storage media transport command from the library control software, etc.

This eliminates the need for the maintenance/repair work that had to be performed in the prior art by maintenance personnel notified of the occurrence of a device failure; as a result, not only can the cost involved in the maintenance/repair work performed by maintenance personnel be reduced, but the utilization rate of the storage media library device itself increases.

Furthermore, as disclosed herein, according to the storage media library device, the control method for the storage media library device, and the program for implementing the same, when a plurality of storage media are being transported by the robot in the storage media library device, if vibrations associated with an earthquake or the like are detected by the vibration detection unit such as a vibration detection sensor installed at a designated position within the storage media library device, the robot control firmware, etc. temporarily stop the transport operation of the robot, and wait until the vibrations subside, while putting the robot in a standby state, within a predefined time period preset in the storage media transport command and monitored by the library control software, etc. Then, when it is detected that the vibrations have subsided, the robot control firmware, etc., perform the operation for measuring the relative positions of the robot with respect to the media drive unit and the media storage unit, and acquire relative position correction data to correct the displacements in the relative positions; after that, the storage media transport operation of the robot is automatically resumed without having to reissue the storage media transport command from the library control software, etc.

This eliminates the need for the various kinds of maintenance/repair work, such as the replacement of affected units in the device and the measurement of the relative positions, that was required in the prior art by maintenance personnel notified of the occurrence of a device failure, and the storage media and the various parts in the device can be reliably prevented from being damaged due to the displacements in the relative positions. As a result, not only can the cost involved in the maintenance/repair work performed by maintenance personnel be significantly reduced, but the utilization rate of the storage media library device itself greatly increases.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A storage media library device comprising a media drive unit which writes and reads information on a plurality of storage media, a media storage unit which stores said storage media in a media storage rack, a robot which is operated to transport said storage media between said media drive unit and said media storage unit, an identification code/relative position detection unit which detects an identification code attached to each of said storage media and also detects relative positions of said robot with respect to said media drive unit and said media storage unit, and a robot control unit which controls the storage media transport operation of said robot based on said identification code and said relative positions detected by said identification code/relative position detection unit, wherein said storage media library device comprises a vibration detection unit which detects occurrence of vibrations, and said storage media library device is connected to a host computer having a library control unit which controls various operations of said media drive unit and said robot control unit, and wherein when said robot is performing said storage media transport operation, if occurrence of vibrations is detected by said vibration detection unit, said robot control unit causes said robot to temporarily stop said storage media transport operation and puts said robot in a standby state, and when said vibration detection unit has detected that the vibrations have subsided within a predefined time period preset in a storage media transport command and monitored by said library control unit, said robot control unit causes said robot to resume said storage media transport operation.

2. A storage media library device as claimed in claim 1, wherein when said robot is held in the standby state, if it is expected that said predefined time period preset in said storage media transport command and monitored by said library control unit will expire before said robot completes said storage media transport operation after resuming said transport operation, said robot control unit shuts down said storage media library device and notifies said library control unit that abnormality has occurred.

3. A storage media library device comprising a media drive unit which writes and reads information on a plurality of storage media, a media storage unit which stores said storage media in a media storage rack, a robot which is operated to transport said storage media between said media drive unit and said media storage unit, an identification code/relative position detection unit which detects an identification code attached to each of said storage media and also detects relative positions of said robot with respect to said media drive unit and said media storage unit, and a robot control unit which controls the storage media transport operation of said robot based on said identification code and said relative positions detected by said identification code/relative position detection unit, wherein said storage media library device comprises a vibration detection unit which detects occurrence of vibrations, and said storage media library device is connected to a host computer having a library control unit which controls various operations of said media drive unit and said robot control unit, and wherein when said robot is performing said storage media transport operation, if occurrence of vibrations is detected by said vibration detection unit, said robot control unit causes said robot to temporarily stop said storage media transport operation and puts said robot in a standby state, and when said vibration detection unit has detected that the vibrations have subsided within a predefined time period preset in a storage media transport command and monitored by said library control unit, said robot control unit corrects any displacements in said relative positions based on said relative positions detected by said identification code/relative position detection unit, and thereafter causes said robot to resume said storage media transport operation.

4. A storage media library device as claimed in claim 3, wherein when said robot is held in the standby state, if it is expected that said predefined time period preset in said storage media transport command and monitored by said library control unit will expire before said robot completes said storage media transport operation after resuming said transport operation, said robot control unit shuts down said storage media library device and notifies said library control unit that abnormality has occurred.

5. A storage media library device as claimed in claim 3, wherein after the occurrence of vibrations is detected, said library control unit monitors the expiration of said predefined time period in said storage media transport command by considering robot initialization time required to initialize said robot after resuming said storage media transport operation, relative position correcting time required to correct the displacements in said relative positions, and remaining time left for completion of said storage media transport operation.

6. A storage media library device as claimed in claim 3, wherein when the occurrence of vibrations is detected, said robot control unit performs control to move said robot to a safe place where said robot does not come into contact with said media storage unit or said media drive unit by controlling up-and-down, back-and-forth, right-and-left, and rotational motions of said robot.

7. A storage media library device as claimed in claim 3, wherein said vibration detection unit has the function of detecting the magnitude of shaking caused by vibrations, and wherein when the magnitude of shaking detected by said vibration detection unit is smaller than a threshold, said robot control unit causes said robot to resume said storage media transport operation from said standby state, while on the other hand, when the magnitude of shaking detected by said vibration detection unit is larger than said threshold, said robot control unit shuts down said storage media library device and notifies said library control unit that abnormality has occurred.

8. A storage media library device as claimed in claim 3, wherein said robot control unit performs control so that said robot is moved from said standby state so as to bring said storage media to a safer place in accordance with the storage media transport operation being performed by said robot when the occurrence of vibrations is detected.

9. A storage media library device as claimed in claim 3, wherein when it is detected that the vibrations have subsided, said robot control unit causes said robot to perform a pushing action for pushing said storage media into said media storage rack in said media storage unit, and corrects displacements in said relative positions after determining by the storage media pushing action of said robot whether any of said storage media had fallen off said media storage rack.

10. A storage media library device as claimed in claim 3, wherein when it is detected that the vibrations have subsided, said robot control unit detects by using said identification code/relative position detection unit whether any of said storage media is protruding from said media storage rack in said media storage unit and, after correcting displacements in said relative positions by avoiding the position of any storage media protruding from said media storage rack, causes said robot to perform a pushing action for pushing any protruding storage media into said media storage rack in said media storage unit.

11. A storage media library device control method for controlling a storage media library device comprising a media drive unit which writes and reads information on a plurality of storage media, a media storage unit which stores said storage media in a media storage rack, a robot which is operated to transport said storage media between said media drive unit and said media storage unit, an identification code/relative position detection unit which detects an identification code attached to each of said storage media and also detects relative positions of said robot with respect to said media drive unit and said media storage unit, and a vibration detection unit which detects occurrence of vibrations, said control method comprising:

when said robot is performing said storage media transport operation, if occurrence of vibrations is detected by said vibration detection unit, causing said robot to temporarily stop said storage media transport operation and putting said robot in a standby state, and when said vibration detection unit has detected that the vibrations have subsided within a predefined time period preset in a storage media transport command, correcting any displacements in said relative positions based on said relative positions detected by said identification code/relative position detection unit, and thereafter causing said robot to resume said storage media transport operation.

12. A control method as claimed in claim 11, wherein when said robot is held in the standby state, if it is expected that said predefined time period preset in said storage media transport command will expire before said robot completes said storage media transport operation after resuming said transport operation, said storage media library device is shut down and a notification is delivered to notify that abnormality has occurred.

13. A control method as claimed in claim 12, wherein when the occurrence of vibrations is detected, control is performed to move said robot to a safe place where said robot does not come into contact with said media storage unit or said media drive unit by controlling up-and-down, back-and-forth, right-and-left, and rotational motions of said robot.

14. A control method as claimed in claim 13, wherein when smaller magnitude shaking caused by vibrations than a threshold is detected by said vibration detection unit, said robot is caused to resume said storage media transport operation from said standby state, while on the other hand, when larger magnitude shaking caused by vibrations than said threshold is detected by said vibration detection unit, said storage media library device is shut down and a notification is delivered to notify that abnormality has occurred.

15. A control method as claimed in claim 11, wherein control is performed so that said robot is moved from said standby state so as to bring said storage media to a safer place in accordance with the storage media transport operation being performed by said robot when the occurrence of vibrations is detected.

16. A control method as claimed in claim 11, wherein when it is detected that the vibrations have subsided, said robot is caused to perform a pushing action for pushing said storage media into said media storage rack in said media storage unit, and displacements in said relative positions are corrected after determining by the storage media pushing action of said robot whether any of said storage media had fallen off said media storage rack.

17. A control method as claimed in claim 11, wherein when it is detected that the vibrations have subsided, then it is detected by using said identification code/relative position detection unit whether any of said storage media is protruding from said media storage rack in said media storage unit, and after correcting displacements in said relative positions by avoiding the position of any storage media protruding from said media storage rack, said robot is caused to perform a pushing action for pushing any protruding storage media into said media storage rack in said media storage unit.

* * * * *